Nov. 12, 1929.  A. P. BARRO  1,735,721
DEVICE FOR MAKING RECEPTACLES
Filed Dec. 22, 1927  2 Sheets-Sheet 1

Inventor:
A. P. Barro
By Langner, Parry, Card & Langner
Attys

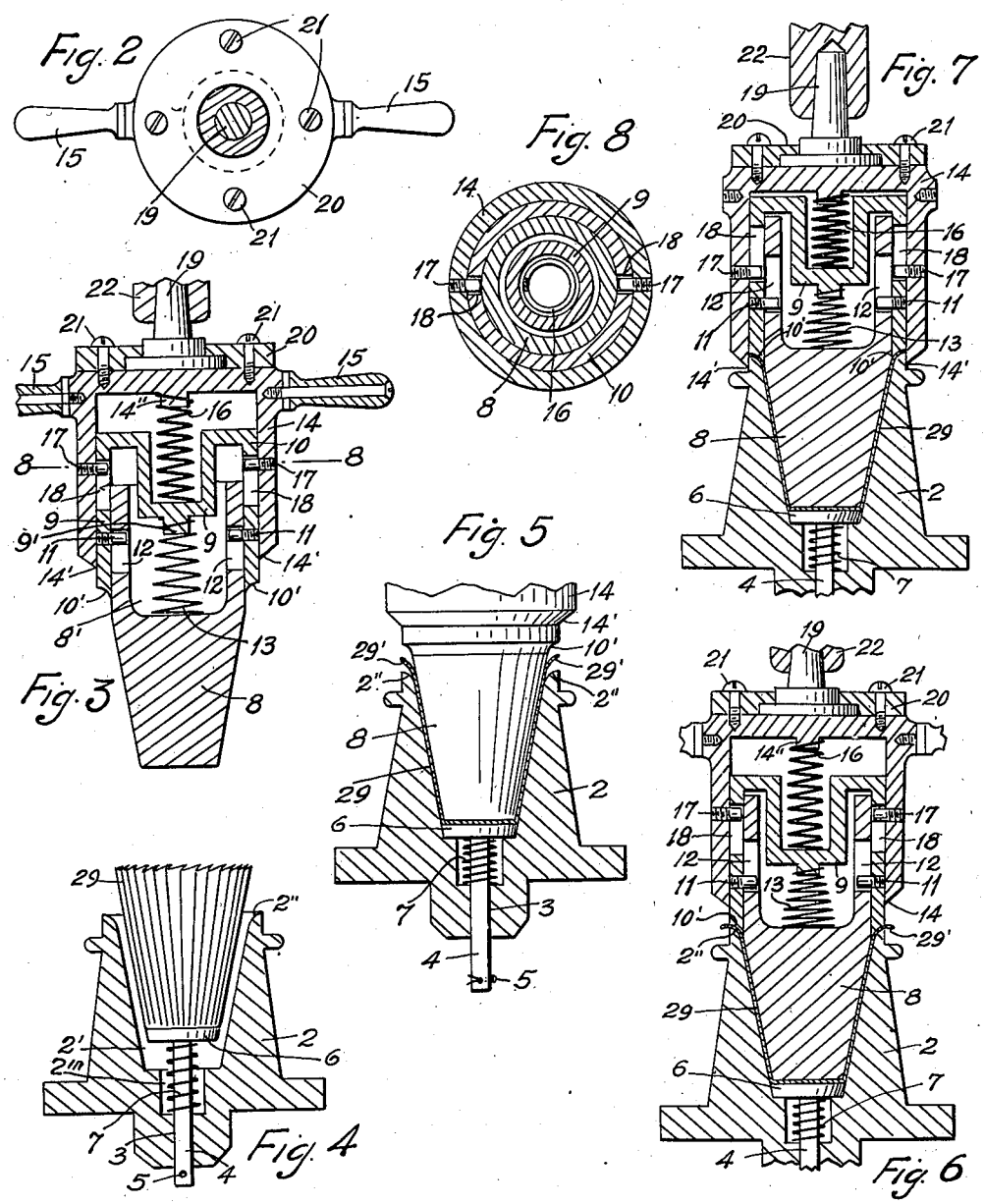

Patented Nov. 12, 1929

1,735,721

UNITED STATES PATENT OFFICE

ANTONIO PEREZ BARRO, OF HABANA, CUBA

DEVICE FOR MAKING RECEPTACLES

Application filed December 22, 1927, Serial No. 241,968, and in Cuba December 14, 1927.

This invention refers to apparatus for making receptacles, and is specially adaptable to the making of cups from cardboard or paraffined paper, or similar material; and has for its main object the provision of a mechanical arrangement, the elements of which operate coordinately together, to shape the receptacle properly, and to form the border of the mouth of same, solidly and evenly, and also to cut off the rough edges of said border.

Receptacles made in this way, have more rigidity, and are of better appearance than those made up to the present time by known devices.

The invention is described with reference to the figures of the attached drawings, wherein the same reference characters designate the same parts.

In the drawings:

Fig. 2 is a horizontal section, in detail, on an enlarged scale, taken along the lines 2—2 of Figure 1.

Fig. 3 is a diametrical, vertical section, in detail, of the "male" mould and the die of the device.

Fig. 4 is a section analogous to that of Figure 3 showing the "female" mould of the device.

Fig. 5 shows in side view an operative position of "male" and "female" moulds the "female" mould appearing in section.

Figs. 6 and 7 are sectional views showing operative positions, of the "male" and "female" moulds.

Fig. 8 is a horizontal section taken along the lines 8—8 of the Figure 3.

Figure 1:
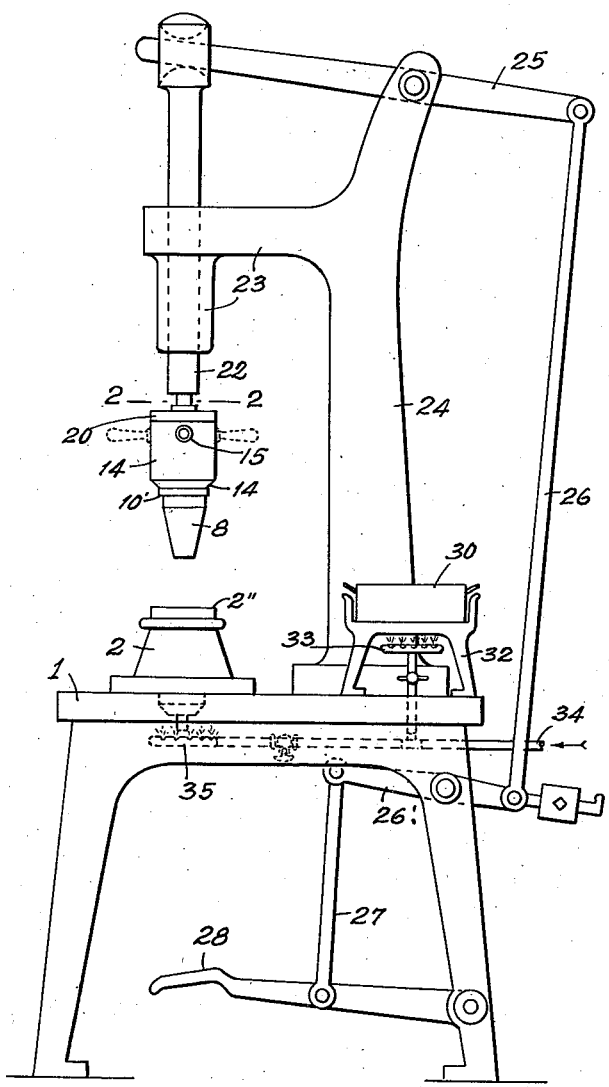
Fig. 1 is a side elevation of the cup-forming apparatus.

Referring to the several figures of the drawings, a female mould 2 is shown, secured to a frame or work-table 1, the inner hollow 2', of which female mould, is adapted to fit to the shape of a receptacle of a given size, said mould having its edges flared as shown at 2". The bottom of the mould has a recess 2''' and in same is a bore 3, through which is mounted a stem 4, where on its outer end, which abuts from the lower part of the "female" mould 2 under the table 1, is fastened a pin 5, and on the upper end is secured a plate 6, approximately of the same size as the inner shape of the bottom of the mould 2, a spring 7 being coiled around said stem, the end of which bears on the plate 6 and on the bottom of the recess 2''' respectively.

Cooperating with the "female" mould described, is a "male" mould which at the same time is a die and bordering piece. Said mould as shown in Figure 3 consists of a main body 8, the solid lower portion of which, is adapted to the inner shape of the "female" mould 2, and in its upper part having a hollow 8', in which can be housed the lower cylindrical part 9 of a bordering piece, consisting also of an outer cylindrical piece 10, concentric and integral with the part 9, said wall 10, ending in moulded borders 10' and being fastened to the stems 11, which slide in guide slots 12, formed in the walls of the upper hollowed part of the body 8.

The lower part of the part 9, has a reduced extension 9' and on same is coiled a spiral spring 13 which is housed in the recess 8' of the body 8, bearing on the bottom of same.

Around the bordering piece described is adjusted a die of cylindrical form 14', ending in sharp edges 14''. To the upper part of said die are screwed the handles 15, the object of which will be explained further along. From the inner surface of the upper part of the die, extends an ear 14'', upon which bears a spring 16 much stronger than the spring 13, the lower end of this spring bearing on the bottom of the entering part of the bordering piece 9.

Pins 17 are shown fixed to the wall of the die 14 which slides in slots 18 opening in the inner wall 10 of the bordering piece.

The "male" mould including the bordering piece and die, as described, is mounted loosely on a bearing 19, by means of a plate 20 fastened to the lower part of the die 14, by means of screws 21. The support 19 is socketed in a rod mounted through the hub of a bracket 23, provided with a standard 24, fastened to the table 1, and in the upper part of which is pivoted a lever 25 connected respectively in its ends to the rod 22, and to a rod 26, and the lower part of which is connected to a set of levers 26' and the rod 27, all of said system being operated by the treadle 28, and being shown only for the purpose of explaining its operation, but which may be substituted by any other mechanism, adequate for the purpose.

Figure 9:
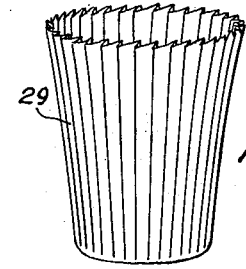
Figs. 9, 10, 11 and 12 are perspective views, in detail, showing the different steps in the formation of a cup or receptacle by means of the apparatus of the present invention.
Figure 10:
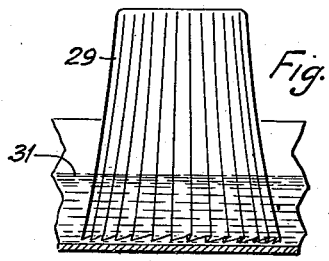

The operation of this device is explained as follows:

Assuming a blank 29, for making a receptacle of cardboard or similar material, folded in the shape shown in Fig. 9. Said blank is turned down and submerged, as seen in Fig. 10, in a receptacle 30 filled with paraffine or other waterproof material 31, and which receptacle is placed over a standard 32, secured upon the table 1, and under which is an annular gas burner 33, connected by a pipe 34 with another like burner 35, situated under the "female" mould 2, although obviously the arrangement of burner and receptacle may be changed, and an other arrangement may be employed if desired.

Figure 11:
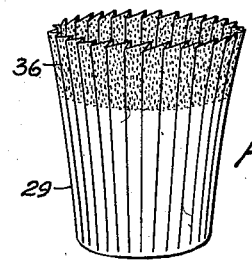

The upper part of the folded blank 29 is in this manner dampened in the paraffine, as seen in 36, of Fig. 11, and said blank is placed in the "female" mould 2, the "male" mould, bordering piece and die, being held raised and out of same, as shown in the Fig. 1, and in said position, under the tension of the spring 7, the blank 29 which rests upon the plate 6, will remain raised, its upper part extending out from the mould 2.

The treadle 28 is then pressed, and by means of rods, and levers 25, 26, 26' and 27 connected to the rod 22, the "male" mould, bordering piece and die, will be lowered until the body 8 is housed within the blank 29, the springs 7 and 13, yielding and consequently the plate 6 will be placed over and upon the bottom of the "female" mould 2 and pressing the moulded border 10' of the bordering die 10 on the upper edge of the folded blank 29, against the upper recessed edge of the female mould 2 as may be clearly seen in Fig. 6.

To make the border of the blank more even the handles 15 are used manually, giving a shifting movement to the "male" mould bordering piece and die, around the standard 19, thereby moulding perfectly the border, as well as the body of the receptacle to be shaped.

Figure 12:
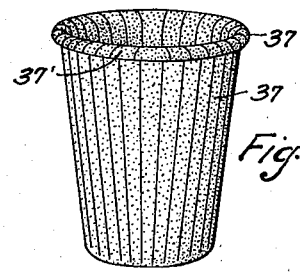

By pressing the treadle 28 more strongly, the spring 16 is made to yield, and consequently, as seen in Fig. 7, the die 14, will be lowered, the pins 17 sliding along the slots 18, and its sharpened borders 14' which cut off the rough edges 29' of the sheet 29, thereby shaping, as shown in Fig. 12, the receptacle 37, provided with a border 37' which makes same absolutely solid and durable.

Claims:

1. In apparatus for making receptacles, a stationary "female" adapted to contain in its interior a folded blank for making a receptacle; a " male" mould registering with the female mould for moulding by pressure the blank contained in the "female" mould; a bordering piece and a die, arranged slidably around the "male" mould springs for operating said bordering piece and die, the springs which operate the die being stronger than those which operate the bordering piece; and means for causing the movement of the "male" mould, the bordering piece and die, to and from the "female" mould.

2. In aparatus for making receptacles, the combination of a stationary female mould, adapted to contain in its interior a folded blank for making a receptacle and the border of said mould being flared for moulding the border of the receptacle; a yieldable standard mounted through the bottom of said mould, for holding the upper part of the blank folded within same, projecting out from the mould; a male mould movable normally toward and away from the "female" mould; a bordering piece adjusted yieldably around the "male" mould, for moulding the border of the receptacle; a die arranged around the bordering piece and arranged to yield, after having cut off the rough edges, of the border of the formed receptacle resulting in the formation of the border; means for carrying loosely the "male" mould, bordering piece and die; and means for causing the movement of these three parts to and from the "female" mould.

3. In apparatus for making receptacles, a "female" mould, a frame on which said female mould is mounted fixedly, said mould being adapted to contain in its interior a folded blank for making receptacles, and the upper edge of which is shaped for moulding the border of the receptacle; a spring controlled standard mounted through the bottom of the mould, and upon which normally rests the folded blank being held with its upper part projecting out of the mould; a "male" mould adaptable to register within the "female" mould; a bordering piece having a pin and slot connection with said male mould and surrounding the later the lower edges of said bordering piece cooperating with upper edges of the "male" mould, for shaping the border of said receptacle; a spring placed between the bordering piece and the "male" mould, causing the first to yield downwardly around the second; a die arranged around the bordering piece and connected thereto by a pin and slot connection, a spring placed between the die and the bordering piece, this spring being stronger than the spring placed between the bordering piece and he "male" mould; and causing this die to yield downwardly under a stronger pressure; handles fastened to the die; a standard holding the die loosely, and means for causing the movement of the unit formed by the "male" mould, the bordering piece and the die, to and from the "female" mould.

4. In apparatus for making receptacles, a "female" mould, a work frame in which said female mould is fixedly mounted, said female mould being adapted to enclose in its interior the folded blank for a receptacle, and having its upper edges flared for shaping the border of the receptacle; a standard slidably mounted through the bottom of the mould and ending in a supporting plate for the folded blank within the mould; a spring coiled around the standard forcing the upper part of the folded blank normally to project out of the mould; a male mould having a recessed upper part, a bordering piece engaged around the "male" mould and ending in an edge, the shape of which is adapted to cooperate with the upper edge of the "female" mould, for shaping the border of the receptacle; a spring housed within the recess of the "male" mould and held between this and the lower part of the bordering piece; a pin and slot connection between the bordering piece and the "male" mould, to permit the first to yield downwardly against the pressure of the spring; a die arranged around the bordering piece; a spring placed between the bordering piece and the die, this spring being stronger than that placed between the "male" mould and the bordering piece; a pin and slot connection between said die and the male mould causing the die to yield downwardly, against the pressure of the last spring, said die having sharp borders for cutting off the rough edges resulting from the formation of the border of the receptacles; handles fastened to the upper part of the die; a loose mounting between the unit, consisting of the "male" mould, bordering piece and die; a mechanism which causes the movement of compression of said unit to and from the "female" mould, and means for heating the "female" mould.

In testimony whereof I have signed my name to this specification.

ANTONIO PEREZ BARRO.